(12) United States Patent
Kouwenhoven et al.

(10) Patent No.: US 7,197,292 B1
(45) Date of Patent: Mar. 27, 2007

(54) CHOPPER STABILIZED ANALOG MULTIPLIER

(75) Inventors: Michael Hendrikus Kouwenhoven, Zoetermeer (NL); Arie van Staveren, Hazerswoude-dorp (NL)

(73) Assignee: National Semiconductor Corporation, Santa Clara, CA (US)

( * ) Notice: Subject to any disclaimer, the term of this patent is extended or adjusted under 35 U.S.C. 154(b) by 360 days.

(21) Appl. No.: 10/932,469

(22) Filed: Sep. 1, 2004

(51) Int. Cl.
*H04B 1/10* (2006.01)
*H04B 1/26* (2006.01)

(52) U.S. Cl. .................. 455/311; 455/314; 455/323

(58) Field of Classification Search ............... 455/296, 455/302, 307, 311, 313–314, 318, 323; 327/113
See application file for complete search history.

(56) References Cited

U.S. PATENT DOCUMENTS

| 5,486,788 | A | 1/1996 | Schlager et al. | |
| 5,489,868 | A | 2/1996 | Gilbert | |
| 6,204,719 | B1 | 3/2001 | Gilbert | |
| 6,380,801 | B1 | 4/2002 | McCartney | |
| 6,445,726 | B1 * | 9/2002 | Gharpurey | 375/136 |
| 6,639,460 | B1 | 10/2003 | Botker | |
| 6,674,322 | B2 | 1/2004 | Motz | |
| 6,707,336 | B2 | 3/2004 | Reber | |

OTHER PUBLICATIONS

Abidi, Asad A.. 2004. "RF CMOS Comes of Age." *IEEE Journal of Solid-State Circuits* 39:4 (Apr.) 549-561.

Bakker, Anton et al. 2000. "A CMOS Nested Chopper Instrumentation Amplifier with 100nV Offset." *IEEE International Solid-State Circuits Conference* (Feb.) 156-157, 452.

Bult, Klaas and Hans Wallinga. 1987. "A Class of Analog CMOS Circuits Based on the Square-Law Characteristic of an MOS Transistor in Saturation." *IEEE Journal of Solid-State Circuits* 22:3, (Jun.) 357-365.

Enz, Christian C. and Gabor C. Temes. 1996. "Circuit Techniques for Reducing the Effects of Op-Amp Imperfections: Autozeroing, Correlated Double Sampling, and Chopper Stabilization." *Proceedings of the IEEE* 84:11 (Nov.) 1584-1614.

Gilbert, Barrie. 1968. "A New Wide-Band Amplifier Technique." *IEEE Journal of Solid-State Circuits* 3:4 (Dec.) 353-365.

(Continued)

*Primary Examiner*—Nguyen T. Vo
(74) *Attorney, Agent, or Firm*—Darby & Darby PC; John W. Branch (57) ABSTRACT

A method and circuit to eliminate an offset noise, which may be produced at or near DC (zero Hertz) in an analog, linear multiplier, is described. An input signal is chopped (converted to another frequency) by a first chopper, shifting a frequency of the input signal such that the multiplier output signal is shifted away from DC. An output signal of the multiplier is subsequently chopped again by a second chopper employing the same chopping frequency as the first chopper. This converts a frequency of the output signal to a desired frequency at or near DC. The double chopping also shifts the offset noise produced by the multiplier to a frequency, that is higher than the frequency of the output signal. The offset noise can then be removed by a low-pass filter leaving the output signal without the offset noise.

22 Claims, 5 Drawing Sheets

OTHER PUBLICATIONS

Gilbert, Barrie. 1968. "A Precise Four-Quadrant Multiplier with Subnanosecond Response." *IEEE Journal of Solid-State Circuits* 3:4 (Dec.) 365-373.

Kimura, Katsuji. 1994. "A Bipolar Four-Quadrant Analog Quarter-Square Multiplier Consisting of Unbalanced Emitter-coupled Pairs and Expansions of its Input Ranges." *IEEE Journal of Solid-State Circuits* 29:1 (Jan.) 46-55.

Kimura, Katsuji. 1996. "Some Circuit Design Techniques for Low-Voltage Analog Functional Elements Using Squaring Circuits." *IEEE Transactions on Circuits and Systems* I 43:7 (Jul.) 559-576.

Soo, David C. and Robert G. Meyer. 1982. "A Four-Quadrant NMOS Analog Multiplier." *IEEE Journal of Solid-State Circuits* 17:6 (Dec.) 1174-1178.

* cited by examiner

CHOPPER STABILIZED ANALOG MULTIPLIER

FIELD OF THE INVENTION

The present invention relates to analog multipliers, and in particular, to a method and circuit for eliminating an offset noise at or near zero Hertz for multipliers handling two input signals with substantially the same frequency.

BACKGROUND

Multipliers are commonly used in a wide variety of electronic devices to shift one or more frequencies to a different value. In many applications, a local oscillator ("LO") signal may be generated for down conversion of a received RF signal. Examples include digital broadcast system (DBS) tuners or receivers, cable modem tuners, and a variety of devices operating within wireless communication systems such as a cellular telephones, cordless telephones, wireless handsets, mobile stations, pagers, and the like. In these and other applications, the received RF signal usually takes a form of a carrier signal at a carrier frequency that is modulated by an information signal at a baseband frequency. As the baseband frequency is typically much lower than the carrier frequency, a receiver must translate or down convert the carrier frequency of the RF signal down to the baseband frequency in order to extract the baseband information from the signal.

In some systems, the frequency of the RF signal may first be converted to an intermediate frequency (IF) and the IF may then be converted to the baseband frequency. In some other systems, which are referred to as direct translation or direct conversion systems, the RF frequency is converted directly to the baseband frequency. Direct conversion systems may be advantageous in that the IF stage is eliminated, thereby reducing the cost and size of communication devices incorporating the systems. Multipliers implemented in power detection circuits, analog demodulators, zero-IF receiver front-ends, and the like, may encounter an intended output signal that is located near DC (zero Hertz), which may be located in the same frequency range as a low-frequency noise generated by the multiplier.

Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment or an embodiment combining software and hardware aspects. The following detailed description is, therefore, not to be taken in a limiting sense.

Throughout the specification, references are made to frequency components of signals, voltages, or currents. A signal, a voltage, or a current may include a plurality of frequency components. Some of those frequency components may be generated intentionally, while others may be generated unintentionally by various processes and circuitry. The frequency component of a signal may be shifted to a different frequency in a process such as multiplication of the signal with another signal. Accordingly, the frequency components, mentioned in the specification, refer to those of interest, and signals, voltages, or currents should not be construed as comprising only those frequency components, mentioned in the specification.

As used in the specification, "chopping" refers to multiplication of a first signal that includes a first frequency $f_1$ with a second signal that includes a second frequency $f_2$, so that an output signal includes at least two frequency components. One frequency component of the output signal may be substantially at $f_1-f_2$, and another frequency component of the output signal may be substantially at $f_1+f_2$.

Briefly stated, the present invention is directed to improving an accuracy and resolution of linear analog multipliers, electronic circuits that multiply two analog electric signals. Such signals may be currents or voltages that are continuous in amplitude and also continuous in time. Multiplier circuits may be implemented in a multitude of applications, ranging from instrumentation systems to communication equipment.

According to one aspect of the present invention, a method and circuit to eliminate a low-frequency noise associated with an offset component, which may be produced at or near DC (zero Hertz) in an analog, linear multiplier, is described. An input signal may be chopped (converted to another frequency) by a first chopper, shifting a frequency of the input signal to prevent a component of the output signal of the multiplier at or near DC. An output signal of the multiplier may subsequently be chopped again by a second chopper employing the same chopping frequency as the first chopper. This may convert a frequency of the output signal to a desired frequency at or near DC. The double chopping may also shift the low-frequency noise produced by the multiplier to a frequency, that is higher than the frequency of the output signal. The "up-converted" low-frequency noise can then be removed by a low-pass filter improving an accuracy and a resolution of the circuit.

Figure 1:
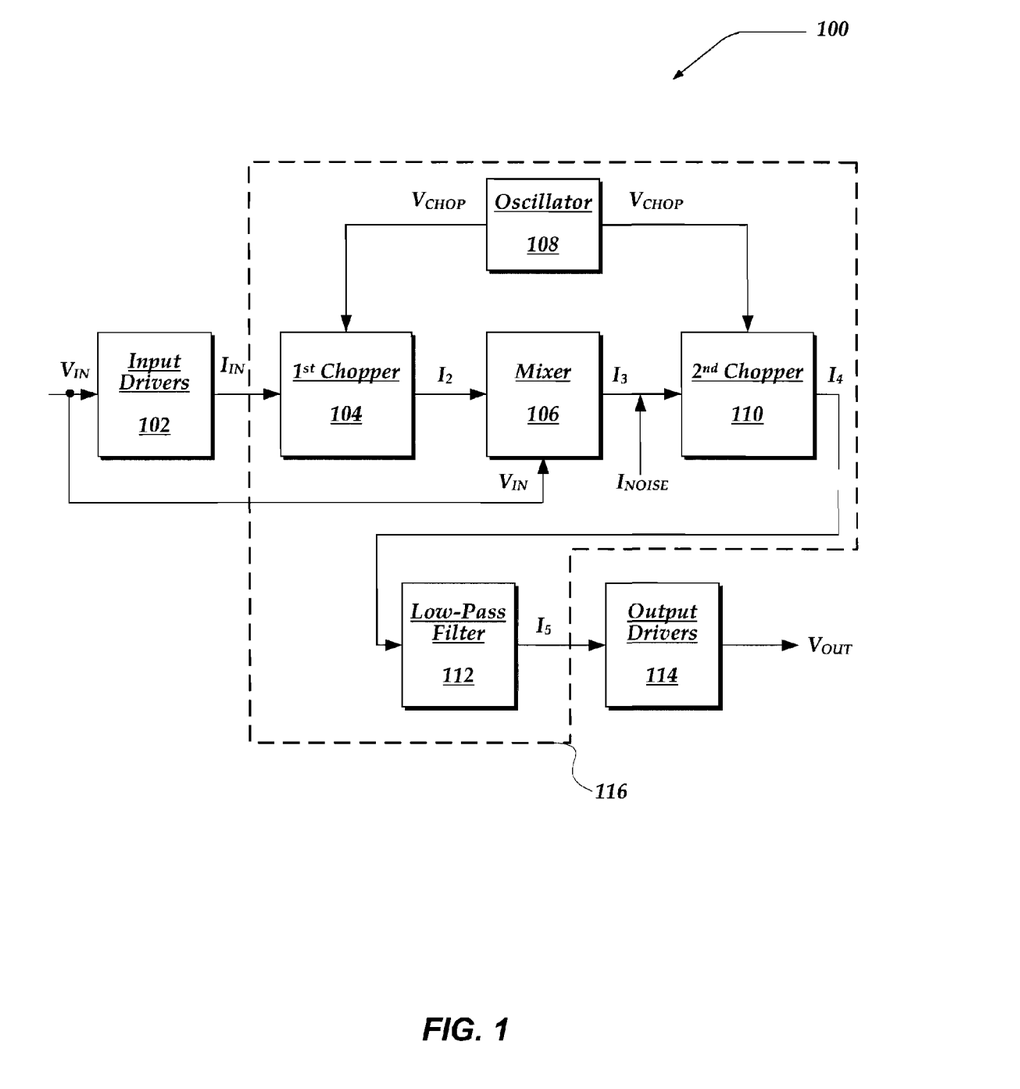
FIG. 1 is a block diagram illustrating one embodiment of a multiplier device with a multiplier circuit, input drivers, and output drivers.

FIG. 1 is a block diagram illustrating one embodiment of multiplier device 100 with multiplier circuit 116. Multiplier device 100 is arranged to shift a frequency of an input signal $V_{IN}$ for applications such as power detection circuits, analog demodulators, zero-IF receiver front-ends (which essentially convert a system into a low-IF architecture), and the like. Multiplier device 100 includes input drivers 102, first chopper circuit 104, mixer circuit 106, oscillator 108, second chopper circuit 110, low-pass filter 112, and output drivers 114. In another embodiment, multiplier device 100 may include additional components.

Input drivers 102 are arranged to receive input voltage $V_{IN}$ and provide chopper input current $I_{IN}$ to multiplier circuit 116. In one embodiment, input drivers 102 may be configured to condition $V_{IN}$, and include one or more amplifiers, bias circuitry, and the like. For example, in an RF receiver device, input drivers 102 may include a front end amplifier, a pre-mixer, and the like.

Multiplier circuit 116 is arranged to remove a low-frequency noise associated with an offset that is commonly generated by mixer circuit 106, while shifting a frequency of an output signal to substantially zero Hertz. The removal of the low-frequency noise may provide improved accuracy and dynamic range for multiplier device 100.

To achieve the removal of the offset associated low-frequency noise, chopper input current $I_{IN}$ to multiplier circuit 106 is provided to first chopper circuit 104. $I_{IN}$ may have a frequency $f_{in}$. First chopper circuit 104 is arranged to generate $I_2$ in response to $I_{IN}$ and $V_{CHOP}$ from oscillator 108 such that $I_2$ has at least two frequency components, including one component at $f_{in}+f_{chop}$ and another component at $f_{in}-f_{chop}$.

$I_2$ is provided to mixer circuit 106, which is arranged to receive $V_{IN}$ as its input voltage and multiply $V_{IN}$ with $I_2$. Accordingly, mixer circuit 106 provides $I_3$, which is a result of multiplying $V_{IN}$ with $I_2$, to second chopper circuit 110. $I_3$ may have a frequency component at substantially $f_{chop}$ due to the multiplication operation in mixer circuit 106 and a low-frequency noise component due to offset generated inherently by mixer circuit 106.

Second chopper circuit 110 is arranged to chop $I_3$ employing $V_{CHOP}$ from oscillator 108 such that $I_4$ provided by second chopper circuit 110 includes a mixer product signal, which has a frequency component near DC and the low-frequency noise, which is shifted to $f_{chop}$.

Lastly, $I_4$ may be provided to low-pass filter 112, which is arranged to filter out the low-frequency noise at $f_{chop}$ and leave the mixer product signal with a frequency near DC substantially unchanged.

Output drivers 114 are arranged to receive $I_5$ from multiplier circuit 116, and to provide output voltage $V_{OUT}$. In one embodiment, output drivers 114 may be configured to condition $V_{OUT}$, and include one or more I-V converters, amplifiers, filters, limiters, and the like.

FIG. 1 shows a particular arrangement of inputs and outputs of the various components. Other arrangements of the components may be implemented without departing from the scope and spirit of the present invention.

Figure 2:
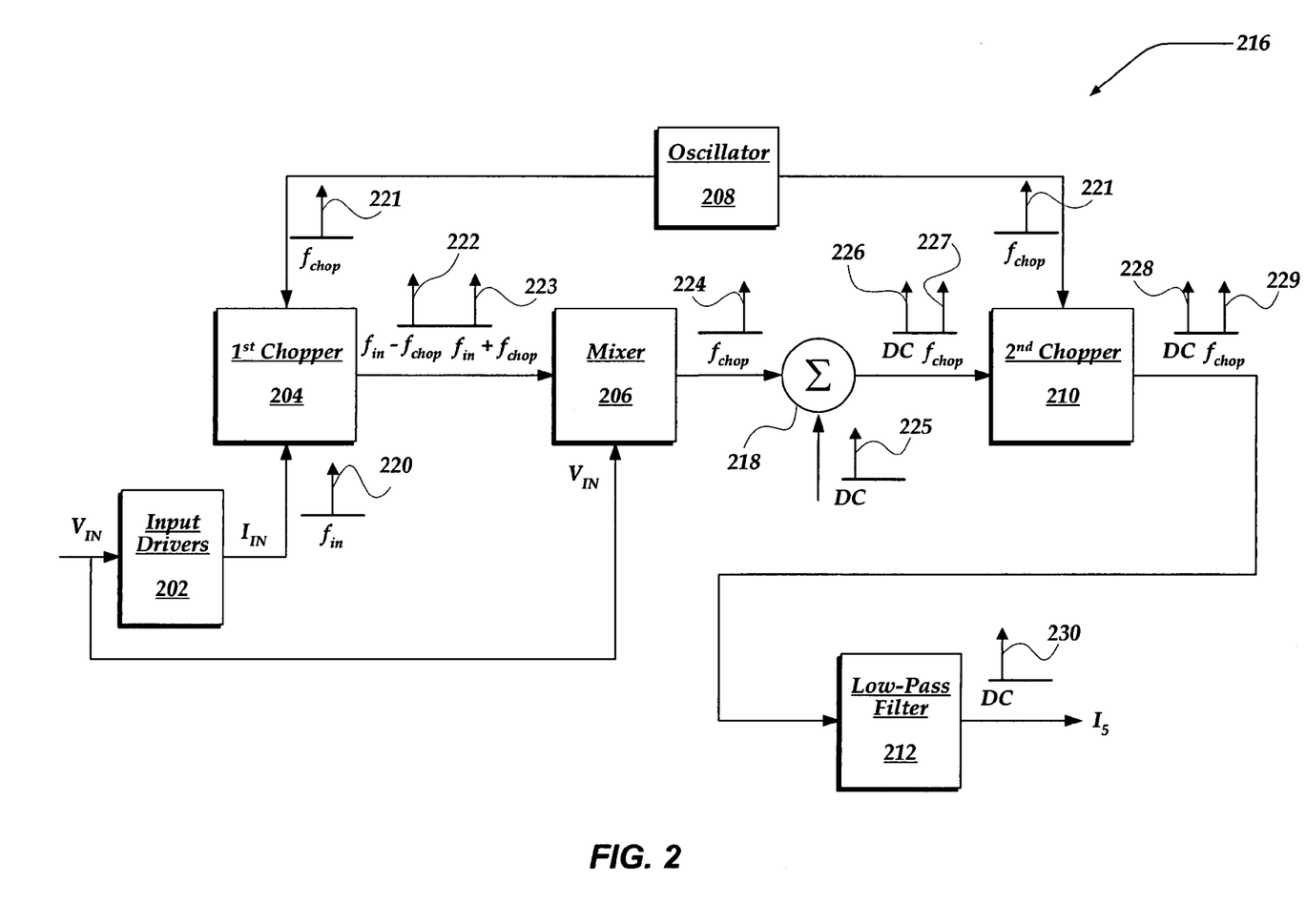
FIG. 2 is a block diagram illustrating the multiplier circuit of FIG. 1 with representations of involved signals at different stages.

FIG. 2 is a block diagram illustrating multiplier circuit 216 and input drivers 202 of FIG. 1 with representations of involved signals at different stages. Multiplier circuit 216 is arranged to receive an input voltage $V_{IN}$ with a frequency at $f_{in}$ and shift its frequency to near zero Hertz, while removing an offset-related low-frequency noise component. Multiplier circuit 216 includes first chopper circuit 204, mixer circuit 206, oscillator 208, summer 218, second chopper circuit 210, and low-pass filter 212. FIG. 2 further depicts signals 220–230 representing frequencies of signals at various stages of multiplier circuit 100

As mentioned above, input drivers 202 are arranged to receive $V_{IN}$ and convert to input current $I_{IN}$ for first chopper circuit 204. First chopper circuit 204 is arranged to receive $I_{IN}$, which may have frequency component 220 at $f_{in}$. First chopper circuit 204 is further configured to perform a frequency conversion for $I_{IN}$, wherein the frequency conversion is performed based on a signal from oscillator 208 that includes frequency component 221 at $f_{chop}$. First chopper circuit 204 essentially performs a multiplication between $I_{IN}$ and $V_{CHOP}$ providing a current with frequency components 222 and 223 at $f_{in}-f_{chop}$ and $f_{in}+f_{chop}$, respectively.

In one embodiment, oscillator 208 may be configured to provide a square wave with frequency $f_{chop}$. Because the purpose of the multiplier circuit 216 is to reduce a low-frequency noise caused by offset at mixer circuit 206, and first and second chopper circuits 204 and 210 are essentially multipliers themselves, oscillator 208 may be arranged to provide the square wave with a substantially zero DC component. In another embodiment, other waveforms may also be provided by oscillator 208. However, independent of the waveform, oscillator 208 is configured to provide a signal with a substantially zero DC component.

Current $I_2$, which has frequency components 222 and 223 is provided to mixer circuit 206. Mixer circuit 206 is arranged to multiply $I_2$ with $V_{IN}$. The multiplication at mixer circuit 206 ideally provides a current with frequency component 224 at $f_{chop}$. However, mixer circuits tend to generate inherently an offset, which results in a low-frequency noise near DC (zero Hertz). Therefore, a practical output current $I_3$ of mixer circuit 206 may have frequency component 226 substantially near zero Hertz and frequency component 227 at $f_{chop}$. FIG. 2 illustrates the addition of the inherent low-frequency noise as adding frequency component 224 and 225 at summer 218.

$I_3$ with frequency components 226 and 227 is then provided to second chopper circuit 210. Second chopper circuit 210 is configured, similar to first chopper circuit 204, to perform a frequency conversion on $I_3$ based on $V_{CHOP}$ from oscillator 208 with frequency component 221 at $f_{chop}$. The second frequency conversion results in the low-frequency noise signal being shifted to $f_{chop}$, while the original signal at $f_{in}$ is shifted substantially toward DC.

A final stage of multiplier circuit 216 is low-pass filter 212. Low-pass filter 212 may be arranged to filter out any frequency components at or above $f_{chop}$ such that low-frequency noise component, now at $f_{chop}$, is removed from an output current $I_5$ of multiplier circuit 216. Output current $I_5$ may include shifted input frequency component 230, which is substantially near zero Hertz, and virtually no offset-related noise component.

FIG. 2 shows a particular arrangement of inputs and outputs of the various components. In one embodiment, all of the components of multiplier circuit 216 may be included in the same chip. Alternatively, one or more of the components may be off-chip.

Figure 3:
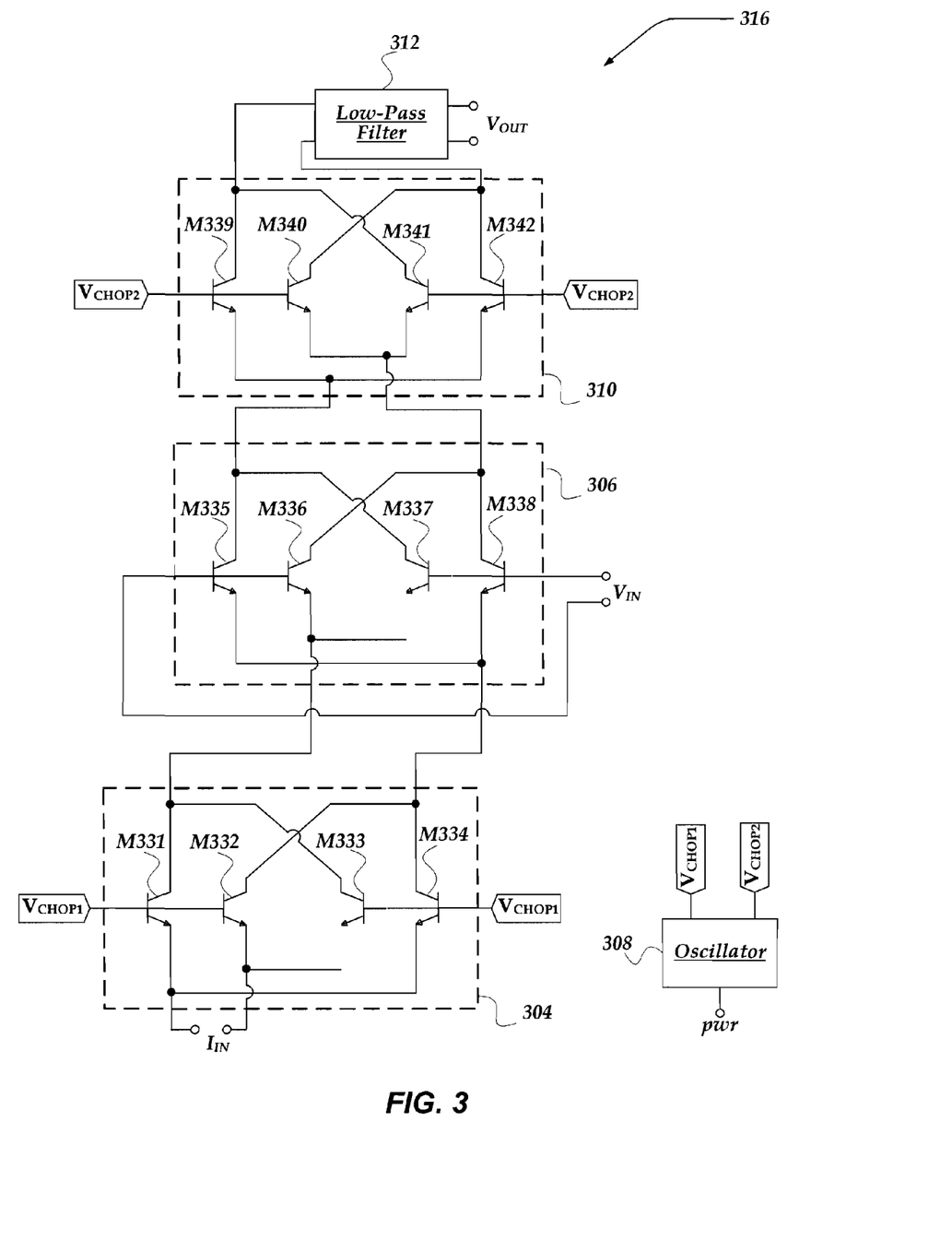
FIG. 3 schematically illustrates an embodiment of the multiplier circuit of FIG. 2.

FIG. 3 schematically illustrates one embodiment of multiplier circuit 216 of FIG. 2. Multiplier circuit 316 includes low-pass filter 312, second chopper circuit 310, mixer circuit 306, first chopper circuit 304, and oscillator 308. Second chopper circuit 310 includes transistors M339–M342. Mixer circuit 306 includes transistors M335–M338. Furthermore, first chopper circuit 304 includes transistors M331–M334.

First chopper circuit 304 and second chopper circuit 310 are arranged to perform a frequency conversion of input current $I_{IN}$ and an output current of mixer circuit 306, respectively. First chopper circuit 304 and second chopper circuit 310 perform this conversion, essentially, by multiplying $I_{IN}$ or the output current of mixer circuit 306 with a square wave. As mentioned previously, the square wave has a substantially zero DC component to prevent residual low-frequency noise and offset in the output signal of multiplier circuit 316.

First chopper circuit 304 and second chopper circuit 310 may be implemented by two sets of bipolar transistors that are arranged to operate as current switches. First chopper circuit 304 comprises a first current switch including transistors M331 and M334, and a second current switch including transistors M332 and M333. Second chopper circuit comprises a third current switch including transistors M339 and M342, and a fourth current switch including transistors M340 and M341. Each of the current switches is essentially a differential pair, of which a common emitter node is employed as input, and two collector terminals are outputs of the current switch. A differential voltage across base terminals of the transistors controls each current switch, determining which of the two transistors is active and conducts an input signal current from its collector terminal to its emitter terminal. The other transistor of the pair, which forms the current switch, is turned off; no current running through its collector terminal.

As observed from its input terminal, first chopper circuit 304 essentially operates as a common-base stage, which intrinsically has a large bandwidth (hence the bandwidth improvement over normal mixer operation).

First chopper circuit 304 is arranged to provide a mixing input signal to mixer circuit 306 to emitter terminals of transistor pairs M335, M338 and M336, M337 of mixer circuit 306. An input driver circuit may be coupled to the input of first chopper circuit 304, and provide an amplification, a V-I conversion, a biasing, and the like for the input signal.

Second chopper circuit 310 is arranged to receive a mixing output current of mixer circuit 306 from collector terminals of the same transistor pairs and provide a frequency-converted current to low-pass filter 312 from collector terminals of transistor pairs M340, M341 and M339, M342.

While FIG. 3 illustrates first chopper circuit 304 and second chopper circuit 310 implemented employing BJT transistors and references to BJT technology are made throughout the specification and claims, MOSFET technology may also be employed. MOSFET transistors may either be used as current switches, operating in saturation, or as voltage controlled resistors, operating in triode mode.

Aspects of the present invention are applicable to two-quadrant and four-quadrant analog mixer circuits. One input of mixer circuit 306, to which first chopper circuit 304 is coupled, is arranged to be bi-polar, i.e. capable of handling currents and voltages of both positive and negative polarity. A second input of mixer circuit 306 may be uni-polar creating a two-quadrant mixer, or bi-polar creating a four-quadrant mixer.

Mixer circuit 306 as depicted in FIG. 3 is a four-quadrant analog mixer comprising transistors M335–M338. While mixer circuit 306 is shown employing BJT transistors and references to BJT technology are made throughout the specification and claims, other technologies such as BiCMOS, HBT, MESFET and MOSFET may also be implemented without departing from the scope or spirit of the invention. A topology of mixer circuit 306, as shown in FIG. 3, may be referred to as "linear transconductance multiplier".

Multiplier circuit 316 may also be implemented in a multiplier device that is based on a so-called "quarter-square" technique, in which multiplication is achieved by subtracting outputs of two squaring circuits. In such multiplier devices, a sum and a difference of two multiplier inputs may be applied to the two squaring circuits. A summing and a subtraction circuit may, therefore, be implemented between an output of first chopper circuit 304 and inputs of the two squaring circuits.

Oscillator 308 is arranged to provide $V_{CHOP1}$ and $V_{CHOP2}$ to first chopper circuit 304 and second chopper circuit 310. In one embodiment, $V_{CHOP1}$ and $V_{CHOP2}$ may include the same frequency component $f_{chop}$, which is employed to perform frequency conversion by first chopper circuit 304 and second chopper circuit 310. In another embodiment, oscillator 308 may include driver amplifiers and circuits that establish proper bias conditions for the chopper circuits.

Low-pass filter 312 is arranged to remove an offset-associated low-noise component of the output signal by removing frequency components at or above $f_{chop}$. Low-pass filter 312 may be implemented as any low-pass filter known to those skilled in the art. In one embodiment, low-pass filter 312 may be further arranged to convert a current provided by second chopper circuit 310 to output voltage $V_{OUT}$.

In one embodiment, additional circuitry may be present between the output of first chopper circuit 304 and the input of mixer circuit 306 that amplify the output signal of first chopper circuit 304, and/or convert the output current of first chopper circuit 304 into a current that is subsequently supplied to mixer circuit 306. Similar circuitry may be placed between the output of mixer circuit 306 and the input of second chopper circuit 310. Because both inputs of mixer circuit 306 are differential, first chopper circuit 304 may also be placed at the other input of mixer circuit 306, in another embodiment.

Figure 4:
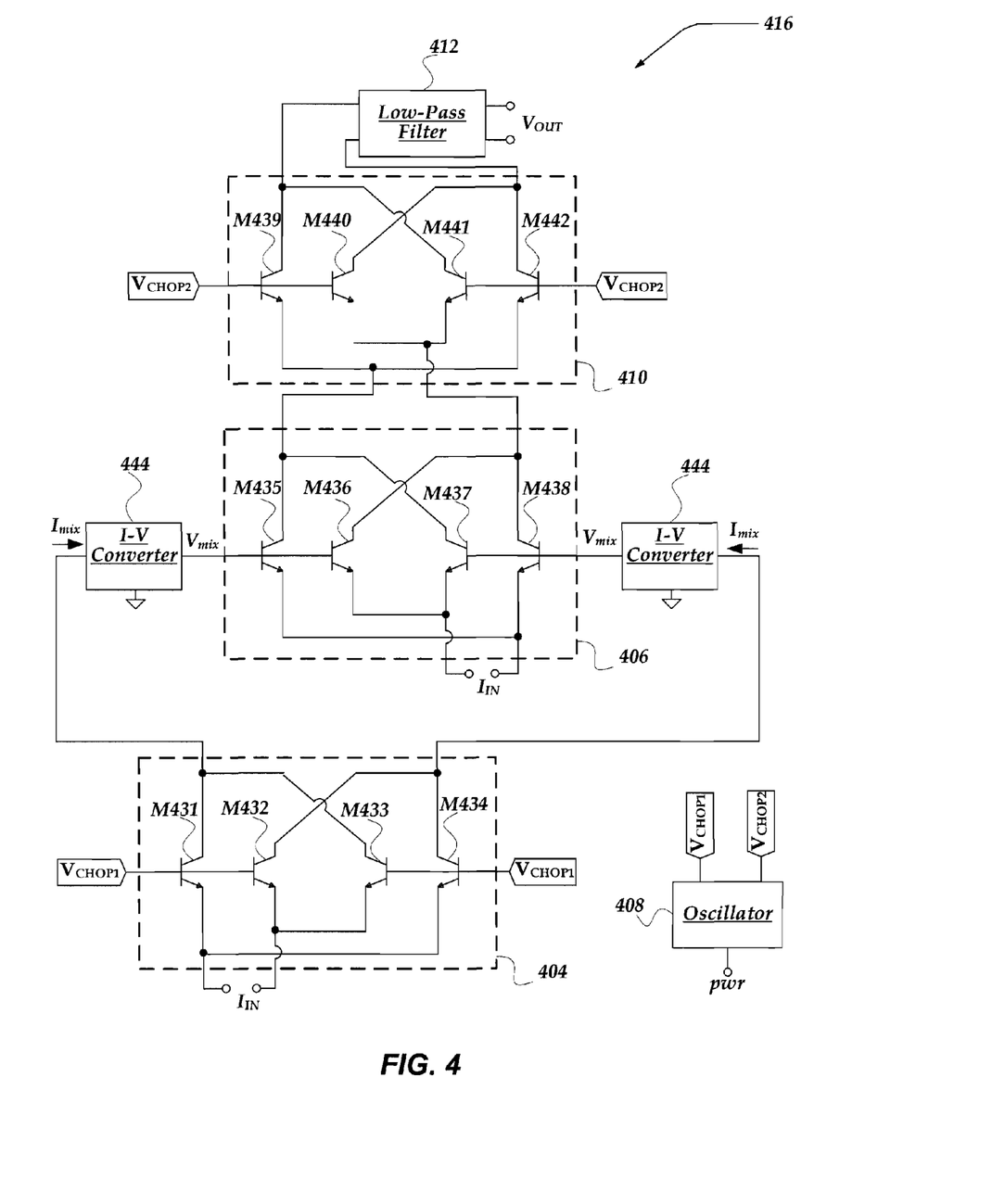
FIG. 4 schematically illustrates another embodiment of the multiplier circuit of FIG. 2.

FIG. 4 schematically illustrates another embodiment of multiplier circuit 216 of FIG. 2. Multiplier circuit 416 includes low-pass filter 412, second chopper circuit 410, mixer circuit 406, I-V converters 444, first chopper circuit 404, and oscillator 408. Second chopper circuit 410 includes transistors M439–M442. Mixer circuit 406 includes transistors M435–M438. Finally, first chopper circuit 404 includes transistors M431–M434.

Oscillator 408, second chopper circuit 410, and low-pass filter 412 shown in FIG. 4 that are similarly named in FIG. 3 operate in substantially the same way as discussed above. While first chopper circuit 404 and mixer circuit 406 are also substantially similar to likewise named components in FIG. 3, connections between these two circuits are different in this embodiment. Additionally, the embodiment shown in FIG. 4 includes I-V converters 444, which are arranged to convert an output current of first chopper circuit 404 to a differential input voltage for mixer circuit 406.

Like in FIG. 3, first chopper circuit 404 is arranged to receive input current $I_{IN}$ at emitter terminals of transistor pairs M431, M434 and M432, M433, and perform a frequency conversion based on $V_{CHOP1}$ provided to base terminals of transistors M431–M434. Differential output current $I_{mix}$ of first chopper circuit 404 is provided from collector terminals of transistor pairs M431, M434 and M432, M433 to inputs of two I-V converters 444.

Each I-V converter 444 is arranged to convert differential output current $I_{mix}$ of first chopper circuit 404 to a differential input voltage $V_{mix}$ for mixer circuit 406, and to provide $V_{mix}$ to base terminals of transistor pairs M435, M438 and M436, M437 on each side of mixer circuit 406. "Unchopped" input current $I_{IN}$ is provided as a second signal to mixer circuit 406 at emitter terminals of transistor pairs M435, M438 and M436, M437, respectively.

I-V converters 444 may extend a linear range of mixer circuit 406 and improve a temperature stability by reducing a nonlinear characteristic of a differential-base-voltage-to-differential-collector current transfer in mixer circuit 406. Employing one or more transistors arranged to operate as a diode, I-V converter 444 may compensate for a temperature-dependent variation of the transistors in mixer circuit 406, and extend the linear range by pre-distorting differential input voltage $V_{mix}$. I-V converter 444 may be implemented in a wide variety of topologies. Some exemplary embodiments are discussed below in FIG. 5.

FIGS. 5A–5D illustrate various embodiments of current-voltage (I-V) converters 444 of multiplier circuit 416 of FIG. 4. I-V converter 544 of FIG. 5A includes transistor M546 and bias voltage source providing $V_{bias}$. I-V converter 544 of FIG. 5B includes transistor M547, differential amplifier 548, and bias voltage source providing $V_{bias}$. I-V converter 544 of FIG. 5C includes transistor M550, differential amplifier 549, and bias voltage source providing $V_{bias}$. I-V converter 544 of FIG. 5D includes transistors M552 and M553, differential amplifier 551, and bias current source providing $I_{bias}$.

Figure 5A:
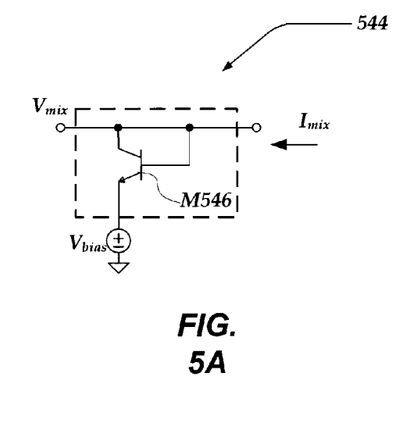
FIGS. 5A–5D illustrate various embodiments of current-voltage converters of the multiplier circuit of FIG. 4 according to the present invention.
Figure 5B:
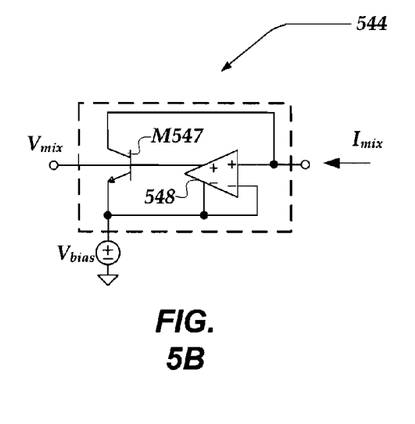
Figure 5C:
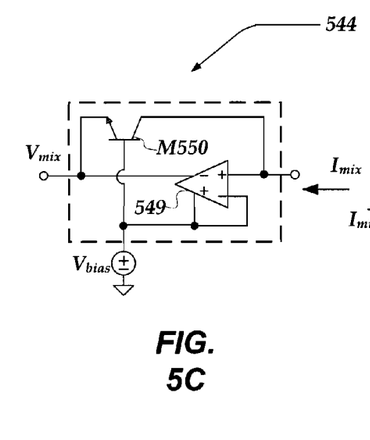
Figure 5D:
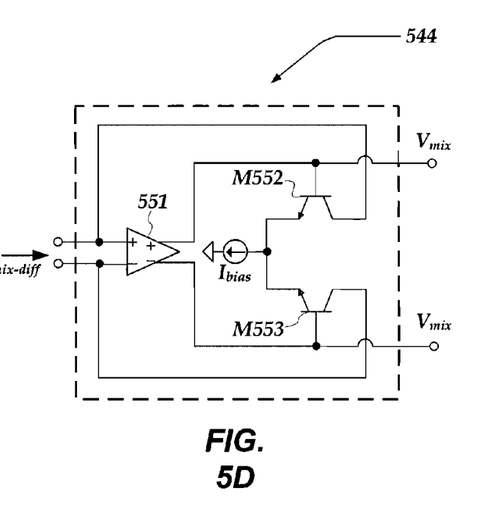

I-V converters 544 are arranged to drive a differential base of mixer circuits such as mixer circuit 406 of FIG. 4 by providing a base voltage to the transistors of the mixer circuit. A basic implementation of I-V converter 544 may employ a resistive circuit (not shown) that is coupled between the base terminal of each transistor in the mixer circuit and a bias voltage source. Such a resistive circuit may convert a differential current at inputs of the mixer circuit to a differential voltage across the base terminals of the transistors. The resistive circuit implementation may, however, result in a relatively dominant effect of non-linear characteristics of the transistors and a temperature dependence of a mixer circuit operation. FIGS. 5A–5C illustrate an embodiment of I-V converter 544, one of which is implemented for each side of the mixer circuit, but both share the same bias voltage or current source. FIG. 5D depicts a fully differential I-V converter that is arranged to drive both sides of the mixer circuit.

I-V converter 544 of FIG. 5A illustrates transistor M546 which is arranged to operate as a diode between the base terminal of each transistor of the mixer circuit and the bias voltage source, which is shared by both I-V converters, extending a linear range and improving a temperature stability of the mixer circuit. A collector and a base terminal of M546 may be coupled to a base terminal of each transistor in the mixer circuit, while an emitter terminal of M546 is coupled to a positive terminal of the bias voltage source, which provides $V_{bias}$. In one embodiment, M546 may be reversed such that the base terminal and the collector terminal of M546 are coupled to the bias voltage source, and the emitter terminal of M546 is coupled to the base terminal of each transistor in the mixer circuit.

FIG. 5B illustrates another embodiment of I-V converter 544, which may have an improved performance compared to the embodiment depicted in FIG. 5A. I-V converter 544 includes transistor M547, which is arranged to operate as a diode in a negative feedback loop of differential amplifier 548. A positive input of differential amplifier 548 may be arranged to receive input current $I_{mix}$ for the mixer circuit. A positive output of differential amplifier 548 may be coupled to the base terminals of each transistor in the mixer circuit as well as to a base terminal of M547 controlling a conduction of M547. A collector terminal of M547 is coupled to the positive input of differential amplifier 548. An emitter terminal of M547 is coupled to a negative input of differential amplifier 548 along with a negative output of differential amplifier 548 enabling M547 to operate as a diode in the negative feedback loop of differential amplifier 548. Differential amplifier 548 provides a relatively improved bandwidth and temperature stability for the mixer circuit.

FIG. 5C illustrates another embodiment of I-V converter 544 of FIG. 5B. The negative output of differential amplifier 549 may provide a voltage to the mixer circuit. In this configuration, the emitter terminal of M550 may be coupled to the negative output of differential amplifier 549 and the base terminal of M550 may be coupled to the positive output of differential amplifier 549 along with the bias voltage source.

FIG. 5D illustrates an embodiment of I-V converter 544, where two I-V converters for each side of the mixer circuit are combined into a single, fully differential I-V converter. Differential amplifier 551 is arranged to receive both polarities of input current $I_{mix\text{-}diff}$ for the mixer circuit at its positive and negative inputs. A positive and a negative output of differential amplifier 551 are arranged to drive the base terminals of each transistor in the mixer circuit along with base terminals of M552 and M553. Collector terminals of M552 and M553 are coupled to the positive and negative inputs of differential amplifier 551, respectively, providing a differential feedback as base-emitter diode. Emitter terminals of M552 and M553 are coupled together to bias current source $I_{bias}$.

In another embodiment, the base terminals of M552 and M553 may be coupled together to $I_{bias}$, and the emitter terminals may be coupled to the negative and positive outputs of differential amplifier 551, respectively, also providing the differential feedback as emitter-base diode.

The above specification, examples and data provide a description of the manufacture and use of the composition of the invention. Since many embodiments of the invention can be made without departing from the spirit and scope of the invention, the invention also resides in the claims hereinafter appended.

We claim:

1. A device for converting a frequency of a radio frequency (RF) signal comprising:
    a first chopper circuit that is arranged to receive the RF signal and a chopping signal; and to provide a first signal based, in part, on multiplying the RF signal with the chopping signal; and
    a mixer circuit that is arranged to receive the first signal and the RF signal and to provide a second signal based on multiplying a first signal with the RF signal; and
    a second chopper circuit that is arranged to receive a second signal and the chopping signal; and to provide an output signal based, in part, on multiplying the second signal with the chopping signal such that a low-frequency noise component of the output signal generated by the mixer circuit is shifted to a higher frequency.

2. The device of claim 1, wherein the RF signal, the chopping signal, the first signal, the second signal, and the output signal are at least one of a voltage and a current.

3. The device of claim 1, wherein a frequency of the chopping signal is $f_1$, and wherein the low-frequency noise component of the output signal is shifted to substantially $f_1$.

4. The device of claim 3, further comprising:
    a low-pass filter that is arranged to substantially remove the low-frequency noise component of the output signal.

5. The device of claim 4, wherein the low-pass filter is arranged to have a predetermined cut-off frequency, so that a signal with a frequency f that is substantially $f \geq f_1$, is removed by the low-pass filter.

6. The device of claim 1, wherein a frequency of the RF signal, $f_{RF}$, is shifted to substantially near zero Hertz.

7. The device of claim 1, wherein the first chopper circuit is arranged to multiply the RF signal with the chopping signal and provide the first signal such that the first signal includes at least one frequency component at $f_{RF}+f_1$ and another frequency component at $f_{RF}-f_1$.

8. The device of claim 1, further comprising:
an oscillator that is arranged to provide the chopping signal to the first chopper circuit and to the second chopper circuit.

9. The device of claim 8, wherein a value of a DC offset component of the chopping signal is substantially zero.

10. The device of claim 1, wherein the second chopper circuit is arranged to multiply the second signal with the chopping signal such that a frequency of the low-frequency noise component is shifted to substantially a frequency of the chopping signal.

11. The device of claim 1, further comprising:
an input driver circuit that is arranged to perform at least one of an amplification, a voltage-to-current conversion, and a biasing on the RF signal before providing the RF signal to the first chopper circuit; and
an output driver circuit that is arranged to perform at least one of an amplification, a current-to-voltage conversion, and a buffering on the output signal before providing the output signal to another device.

12. The device of claim 1, wherein the first chopper circuit comprises:
a first current switch and a second current switch that are arranged to receive the RF signal between two common emitter nodes, the differential chopping signal between two common base nodes, and provide the first signal between two common collector nodes, wherein:
the first current switch comprises:
a first pair of transistors that are arranged to have common emitter terminals, wherein collector terminals of the first pair of transistors are cross-coupled with collector terminals of a second pair of transistors; and
the second current switch comprises:
the second pair of transistors, which are arranged to have common emitter terminals, wherein collector terminals of the second pair of transistors are cross-coupled with collector terminals of the first pair of transistors.

13. The device of claim 1, wherein the second chopper circuit comprises:
a third current switch and a fourth current switch that are arranged to receive the second signal between two common emitter nodes, the chopping signal between two common base nodes, and provide the output current between two common collector nodes, wherein:
the third current switch comprises:
a third pair of transistors that are arranged to have common emitter terminals, wherein collector terminals of the third pair of transistors are cross-coupled with collector terminals of a fourth pair of transistors; and
the fourth current switch comprises:
the fourth pair of transistors, which are arranged to have common emitter terminals, wherein collector terminals of the fourth pair of transistors are cross-coupled with collector terminals of the third pair of transistors.

14. The device of claim 1, wherein the mixer circuit includes at least one current-voltage (I-V) converter that is arranged to convert an output current of the first chopper circuit to a voltage for the mixer circuit.

15. The device of claim 14, wherein the at least one I-V converter comprises at least one of:
a resistor,
a transistor that is arranged to operate as a diode and a bias voltage source,
a differential amplifier, a transistor that is arranged to provide a negative feedback to the differential amplifier, and a bias voltage source; and
a differential amplifier, two transistors arranged to operate as a differential current-to-voltage converter, and a bias current source.

16. The device of claim 1, wherein the first chopper circuit, the second chopper circuit, and the mixer circuit includes at least one of a plurality of BJT, a plurality of MOSFET, a plurality of MESFET, a plurality of BiCMOS, and a plurality of HBT transistors.

17. A method for converting a frequency of a radio frequency (RF) signal comprising:
receiving an RF signal with a frequency $f_{RF}$ and a chopping signal with a frequency $f_1$;
performing a first multiplication between the RF signal and the chopping signal, wherein a DC offset component of the chopping signal is substantially zero;
determining a first signal based on the first multiplication;
performing a second multiplication between the first signal and the RF signal; and
determining a second signal based on the second multiplication.

18. The method of claim 17, further comprising:
performing a third multiplication between a signal based on the second signal and the chopping signal, wherein a DC offset component of the chopping signal is substantially zero;
determining an output signal based on the third multiplication such that a low-frequency noise component of the output signal is shifted to a higher frequency; and
removing the low-frequency noise component.

19. The method of claim 18, wherein performing the second multiplication generates the low-frequency noise component of the output signal.

20. The method of claim 18, wherein a frequency of the low-frequency noise component of the output signal is substantially $f_1$.

21. The method of claim 18, wherein the RF signal, the chopping signal, the first signal, the second signal, and the output signal are at least one of a voltage and a current.

22. A circuit for shifting a frequency of an electrical signal comprising:
a first chopper circuit that is arranged to multiply the electrical signal with a chopping signal and provide a first signal based on the multiplication, wherein the chopper input signal includes a first frequency and the chopping signal includes a chopping frequency;
a mixer circuit that is arranged to multiply the first signal with the electrical signal and provide a second signal based on the multiplication, wherein the second signal also includes a low-frequency noise component;
a second chopper circuit that is arranged to multiply the second signal with the chopping signal and provide a third signal based on the multiplication, wherein the first frequency is shifted to substantially near zero Hertz, and the low-frequency noise component is shifted to substantially the chopping frequency; and
a low-pass filter that is arranged to remove the low-frequency noise component.

* * * * *